United States Patent Office 3,207,581
Patented Sept. 21, 1965

3,207,581
PROCESS FOR PURIFYING BORON TRICHLORIDE
David R. Stern, Fullerton, and Winston W. Walker, Whittier, Calif., assignors to American Potash & Chemical Corporation, Los Angeles, Calif., a corporation of Delaware
No Drawing. Filed Nov. 14, 1961, Ser. No. 152,175
5 Claims. (Cl. 23—205)

This application is a continuation-in-part of our application Serial No. 800,083, filed March 18, 1959 (now abandoned), and application Serial No. 833,970, filed August 17, 1959, now abandoned.

The present invention relates, in general, to the purification of boron trichloride. More particularly, the invention relates to a process for removing contaminating amounts of phosgene and free chlorine from boron trichloride.

Practice of the process of this invention results in the production of a boron trichloride product of such high purity that it can be employed in the treatment of the silicon wafers utilized in semiconductors, solar cells, and the like.

Boron trichloride as produced commercially today always contains phosgene ($COCl_2$) and some free chlorine. These impurities either are introduced into the boron trichloride along with the raw materials employed in its manufacture or are produced in the manufacturing process itself.

Boron trichloride is used extensively as a boron source to treat transistors and silicon wafers in solar cells. The solar wafer is heated to an elevated temperature under controlled conditions, the silicon reacting with the boron trichloride to deposit a monomolecular layer of boron. Phosgene present in the boron trichloride reacts with the silicon to produce excess carbon and oxygen impurities which "poison" the transistor or solar cell.

U.S. Patent 2,369,214 proposes a method of removing phosgene by passing the boron trichloride over boron carbide at 800–1000° C. This process has several disadvantages. In the first place, phosgene is introduced into boron trichloride from boron carbide in the original process step. Commercial boron carbide contains 1–2% of boric oxide ($B_2O_3$). This impurity reacts with chlorine in the presence of carbon to give phosgene.

The surprising discovery now has been made that certain metals can be used to advantage to remove phosgene and chlorine from boron trichloride. These metals are boron and titanium. Surprisingly, it has been found that these metals also will remove silicon tetrachloride, which is another frequent contaminant of boron trichloride. Both boron and titanium have, in common, the ability to form a chloride which, in turn, sublimes or boils at a comparatively low temperature. For example:

| Metal | Compound | Boiling or Sublimation Temp. (° C.) |
|---|---|---|
| B | $BCl_3$ | 12 (liq). |
| Ti | $TiCl_4$ | 136. |

In the case of titanium, the chemistry of the process may be represented theoretically as follows:

$$Ti + 2COCl_2 \rightarrow TiCl_4 + 2CO$$

The reaction is run with the titanium maintained at a temperature within the range of 300° to 450° C. When boron is used it should be maintained at a temperature of from 500° to 600° C.

Broadly, in accordance with this invention, contaminating amounts of phosgene and free chlorine are removed from boron trichloride by passing the same, in vapor form, over heated titanium or boron. This converts the contaminants to chlorides of either titanium or boron. The reaction product mixture of chlorides thus formed then is cooled to a temperature at which all the chlorides, except boron trichloride condense. Thereafter, the condensed chloride contaminants are removed whereby substantially pure boron trichloride is recovered.

To illustrate the invention even more fully, the following specific examples are set forth. It will be understood, of course, that these examples are presented for illustrative purposes only, the scope of the invention being limited only by the appended claims.

Example I

An electrically heated tube furnace containing a reaction tube one-inch in diameter was charged with 265 grams of titanium sponge maintained at about 350° C. Approximately 2.5 pounds of vaporized boron trichloride was passed over this sponge. The results were as follows:

| | In | Out |
|---|---|---|
| Analyses: | | |
| Mol percent $COCl_2$ | 1.96 | 0.005. |
| P.p.m. Si | 14 | Not determined. |
| P.p.m. $Cl_2$ | 22 | Not found. |
| Percent $BCl_3$ | 98.03 | 99.9+. |

| | In (g.) | Out (g.) | (Calculated) |
|---|---|---|---|
| Weights (calculated): | | | |
| $BCl_3$ | 1,021.2 | $BCl_3$ | 1,021.2 |
| Ti | 4.7 | $TiCl_4$ | 18.2 |
| $COCl_2$ | 18.8 | CO | 5.3 |
| | 1,044.7 | | 1,044.7 |

Weights (measured):
  Feed cylinder loss = 2.5 lbs.
  Weight of $BCl_3$ collected = 2.3 lbs.
  Weight of $TiCl_4$ collected = 17.2 g.
Reaction Variables:
  Flow rate = 185 cc. $BCl_3$/(min.).
  Reaction time = 19.5 hrs.
  Temperature = 350° C.
  Titanium charge = 265 g.

Example II

An electrically heated tube furnace containing a reaction tube 2½″ in diameter was charged with 10 pounds of titanium maintained at about 400° C. Approximately 55 pounds of boron trichloride was passed through this tube and over the sponge. The results were as follows:

| | In | Out |
|---|---|---|
| Analyses: | | |
| Mol percent $COCl_2$ | 1.96 | 0.38. |
| P.p.m. Si | 14 | 7. |
| P.p.m. $Cl_2$ | 22 | Not found. |
| Percent $BCl_3$ | 98.03 | 99.56+. |

Reaction Variables:
  Flow rate = 2.3 lbs. $BCl_3$/hr.
  Tube diameter = 2½ inches.
  Length = 24 inches.
  Pressure = 0.2 inch Hg. (gage).

There is a particular advantage in utilizing titanium since it need not be pelleted. Therefore, extraneous materials frequently employed in pelletizing operations are absent from the reaction zone. The end product of the reaction, titanium tetrachloride, has a boiling point (136° C.) which is substantially higher than that of boron trichloride and silicon tetrachloride so that these impurities can be separated conveniently by distillation.

*Example III*

An electrically heated tube furnace was charged with 630 grams of pellets containing 90% sodium chloride and 10% elemental boron. A total of 196 pounds of boron trichloride containing 511 grams of phosgene was passed through this charge at the rate of 1.0 pound/hour. According to the stoichiometry of the following equation, this much phosgene should have utilized all but 16 grams of boron:

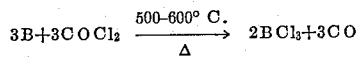

$$3B + 3COCl_2 \xrightarrow[\Delta]{500\text{-}600° \text{C.}} 2BCl_3 + 3CO$$

Analysis of the remainder of the charge after thorough water leaching indicated 20.8 grams of boron remaining. Considering analytical difficulties, this agreement is considered satisfactory. The initial phosgene content of the 196 pounds of boron trichloride was 1.3 mol percent while the final content was 0.004 mol percent.

*Example IV*

In another run, 146 pounds of boron trichloride containing 500 grams of phosgene (1.1 mol percent) was passed over a pelletized charge containing 61.2 grams of boron at a rate of 1.0 pound/hour. The boron was maintained at a temperature of about 550° C. Analyses of the charge residue indicated that 21.5 grams of boron remained unreacted. The stoichiometry indicated that the residue should contain 26.0 grams. This agreement is considered to be within the accuracy of the analysis. The initial phosgene content was reduced from 1.1 mol percent to less than 0.002 mol percent, which is the minimum detectable amount by infrared methods of analyses.

What we claim is:

1. A process for removing trace contaminates including phosgene from boron trichloride which comprises contacting said boron trichloride with a metal selected from the group consisting of titanium and boron maintained at a temperature within the range of from 300° to 600° C. to form a vaporous reaction product which is substantially free of phosgene.

2. A process for removing trace contaminates including phosgene from boron trichloride which comprises passing a stream of said boron trichloride in its vapor form into contact with a mass of titanium heated to from about 300° to 450° C. to form a mixture of chlorides which is substantially free of phosgene, and separating substantially pure boron trichloride from said mixture.

3. A process for removing trace contaminates including phosgene from boron trichloride which comprises passing a stream of said boron trichloride in its vapor state into contact with a mass of boron maintained at a temperature of from about 500° to 600° C. to form a vaporous reaction product which is substantially free of phosgene.

4. A process for removing trace contaminates including free chlorine from vaporous boron trichloride which comprises contacting said boron trichloride with a metal selected from the group consisting of titanium and boron, said metal being maintained at a temperature within the range of from 300° to 600° C. to form a vaporous reaction product which contains substantially no free chlorine.

5. A process for removing trace contaminates including phosgene and silicon from vaporous boron trichloride which comprises passing a stream of said boron trichloride in its vapor form into contact with a mass of titanium, which has been heated to and maintained at a temperature of from about 300° to 450° C., to form a gaseous reaction product containing titanium tetrachloride, boron trichloride and silicon tetrachloride, and thereafter separating the impurities from this reaction product by distillation.

References Cited by the Examiner

UNITED STATES PATENTS

| | | | |
|---|---|---|---|
| 2,931,710 | 4/60 | Leffler | 23—205 |
| 2,946,668 | 7/60 | Richelsen | 23—205 X |
| 3,043,665 | 7/62 | Gould et al. | 23—205 |

MAURICE A. BRINDISI, *Primary Examiner.*